United States Patent [19]
Satoh et al.

[11] Patent Number: 6,031,305
[45] Date of Patent: Feb. 29, 2000

[54] STEPPING MOTOR WITH ROTOR AND STATOR HAVING RELATED AXIAL WIDTH

[75] Inventors: Kouichi Satoh; Hiroyasu Numaya; Kouichi Jinushi, all of Niigata, Japan

[73] Assignee: Nippon Seiki Co., Ltd., Niigata, Japan

[21] Appl. No.: 09/043,442

[22] PCT Filed: May 20, 1997

[86] PCT No.: PCT/JP97/01700

§ 371 Date: Mar. 20, 1998

§ 102(e) Date: Mar. 20, 1998

[87] PCT Pub. No.: WO98/05113

PCT Pub. Date: Feb. 5, 1998

[30] Foreign Application Priority Data

Jul. 26, 1996 [JP] Japan .................................. 8-196820

[51] Int. Cl.$^7$ .................................................. H02K 37/14
[52] U.S. Cl. ........................................ 310/49 R; 310/194
[58] Field of Search ...................... 310/263, 162, 310/187, 49 R, 163, 269, 42, 156, 186, 192, 257, 164; 29/596, 598

[56] References Cited

U.S. PATENT DOCUMENTS

| | | | |
|---|---|---|---|
| 4,672,247 | 6/1987 | Madsen et al. ...................... | 310/49 R |
| 4,841,190 | 6/1989 | Matsushita et al. .................... | 310/257 |
| 5,691,583 | 11/1997 | Suzuki et al. ......................... | 310/49 R |
| 5,770,900 | 6/1998 | Sato et al. ............................. | 310/49 R |

FOREIGN PATENT DOCUMENTS

| | | |
|---|---|---|
| 59-191880 | 12/1984 | Japan . |
| 62-177285 | 11/1987 | Japan . |
| 1-126146 | 5/1989 | Japan . |
| 2-051352 | 2/1990 | Japan . |
| 3-117372 | 12/1991 | Japan . |
| 6-38497 | 2/1994 | Japan . |
| 6-113523 | 4/1994 | Japan . |
| 6-048383 | 6/1994 | Japan . |
| 6-327219 | 11/1994 | Japan . |

*Primary Examiner*—Nestor Ramirez
*Assistant Examiner*—Tran N Nguyen
*Attorney, Agent, or Firm*—McDermott, Will & Emery

[57] ABSTRACT

A stepping motor capable of improving the degree of smoothness of the rotation of the rotor thereof is provided. According to the present invention, when the width of each of magnets (41, 42, or 44, 45) in the axial direction of the rotor (3) of the stepping motor is expressed by $W0$, the width of overlapping of each of sets of pole teeth 15, 16 and 25, 26 in the axial direction of the rotor 3 is expressed by $W1$ and the width of a space between the inner surfaces of each of outer yokes(14, 24) and each of inner yokes(13, 23) is expressed by $W2$, the width $W0$ of each of the magnets (41, 42) is so set as to satisfy the relationship of $W2>W0>W1$.

2 Claims, 5 Drawing Sheets

STEPPING MOTOR WITH ROTOR AND STATOR HAVING RELATED AXIAL WIDTH

TECHNICAL FIELD

The present invention relates to a permanent magnetic type stepping motor and more particularly to a stepping motor useful as a movement of an analogue type indicating meter.

BACKGROUND TECHNOLOGY

Conventionally, there has been a permanent magnet type stepping motor as a structure widely used as an actuator part in such fields as OA equipment, home electrical appliances, automobiles and the like and in many cases, it is provided with an annular stator constructed by combining an exciting coil and a yoke, and a rotor comprising a permanent magnet axially and rotatably supported within a hollow portion of the annular stator. To the peripheral surface of the rotor opposing to the annular stator, a plurality of magnetic poles N and S are magnetized at a constant pitch in an alternative fashion. Further, in the annular stator, a plurality of pole teeth extending to the hollow portion of the stator from the yoke and opposing to the magnetic pole of the rotor are formed at a constant pitch in an annular comb-shape arrangement so that when a pulse signal is supplied to the exciting coil, the yoke including the pole teeth is magnetized and the rotor rotates every predetermined rotational angle by a magnetic action between the pole teeth and the magnetic poles of the rotor. Since this structure has various kinds of advantages such as the capability of achieving a high driving torque in spite of its compactness, attention has been directed to this type of stepping motor of late as a movement of an analogue type indicating meter such as a speedometer and an engine tachometer, for example.

In the case of using this kind of stepping motor as a movement of the analogue type indicating meter, the rotor and the indicator may be connected through a rotary shaft and the rotor interlocked with the indicator may be driven by supplying a pulse signal in response to a measured amount but since the stepping motor operates the rotor stepwise in correspondence to the pitch of the pole teeth, the indication of the measured amount by means of the indicator connected to the rotor also necessarily becomes stepwise, that is, intermittent, so that the rotation of the motor becomes irregular. Accordingly, in the case of using the stepping motor as a movement of the meter, there are proposed, as disclosed in Japanese Unexamined Patent Publication No. 6-38497, a structure in which in order to prevent the rotary shaft of the rotor and the indicator from being directly connected, a reduction gear mechanism comprising a plurality of gears is disposed between them, or as shown in Japanese Unexamined Patent Publication No. 6-82271, a structure in which a pulse signal(voltage) having a stepped waveform closely similar to a sine wave is applied to each of the exciting coils, thereby finely driving the motor stepwise, a so called micro-step drive.

However, in the former structure using the reduction gear mechanism, in addition to the motor itself becoming large-sized, the number of parts is increased to make it difficult to assemble them with ease, so that it is disadvantageous in view of its productivity, and further, there is a fear that the problem of backlash and the like due to the employment of the reduction gear mechanism may arise. On the contrary, in the case of the latter structure using the micro-step drive, it is possible to soften the intermittent motion of the rotor (the indicator) to a level, in which no visual irregularity of the rotor is observed, by finely driving the rotor stepwise according to a predetermined divisional number. However, the rotational angular velocity of the rotor at every step tends to scatter due to an unbalance of the magnetic circuit formed between the magnetic pole of the rotor and the yoke including the pole teeth at every step of the rotor so that it is not sufficient in view of the smoothness of rotation of the rotor.

The present invention has been made by taking these points into consideration and a main object of the invention is to improve the smoothness of rotation of a rotor itself by designing a rotor-yoke structure, and in the case of using the structure as a movement for an analogue type indicating meter, to provide a stepping motor which can secure the rotation of an indicator with no physical disorder without the necessity of providing a reduction gear mechanism.

SUMMARY OF THE INVENTION

The stepping motor of the present invention is constructed such that a first annular stator comprising a pair of inner and outer yokes forming a magnetic path for a first exciting coil and a second annular stator comprising a pair of inner and outer yokes forming a magnetic path for a second exciting coil are concentrically laminated in such a manner that the respective inner yokes come to lie adjacent to each other so as to form a stator-laminated body; a rotor is rotatably supported by a rotary shaft within a hollow portion of the stator-laminated body, the rotor being formed of first and second magnets each having its outer peripheral surface alternately and heteropolarly magnetized with a plurality of magnetic poles along the rotational direction thereof and concentrically fixed to the rotary shaft or being formed of a plastic magnet having its outer peripheral surface alternately and heteropolarly magnetized with a plurality of magnetic poles along the rotational direction thereof and having a small-diameter portion at the center, and large-diameter portions at both ends, thereof, so as to correspond to the annular stators, respectively; and two sets of pole teeth in a comb-teeth type arrangement extending into the hollow portion of the stator-laminated body from the inner and outer yokes along the axis of the rotary shaft of the rotor so as to face the first and second magnets or the first and second large-diameter portions of the plastic magnetic rotor, wherein the width of each of the first and second magnets or the width of each of the large-diameter portions of the plastic magnet is made larger than the width of overlapping of the pole teeth making each of the pole teeth sets and smaller than the width of the space between the inner surfaces of each of the sets of inner and outer yokes making pairs by sandwiching each of the sets of pole teeth therebetween, so that the degree of smoothness of rotation of the rotor is improved and especially when the stepping motor is used as a movement of an analogue indicating meter, it is possible to obtain the:rotation of the motor free of any physical disorder without the necessity of using a reduction gear mechanism.

Further, in this case, when the width of each of the first and second magnets or each of the first and second large-diameter portions is so set as to lie outside the center of the space between the inner surfaces of the inner and outer yokes, the degree of smoothness of rotation of the rotor can be further improved.

DESCRIPTION OF THE PREFERRED EMBODIMENTS

Figure 1:
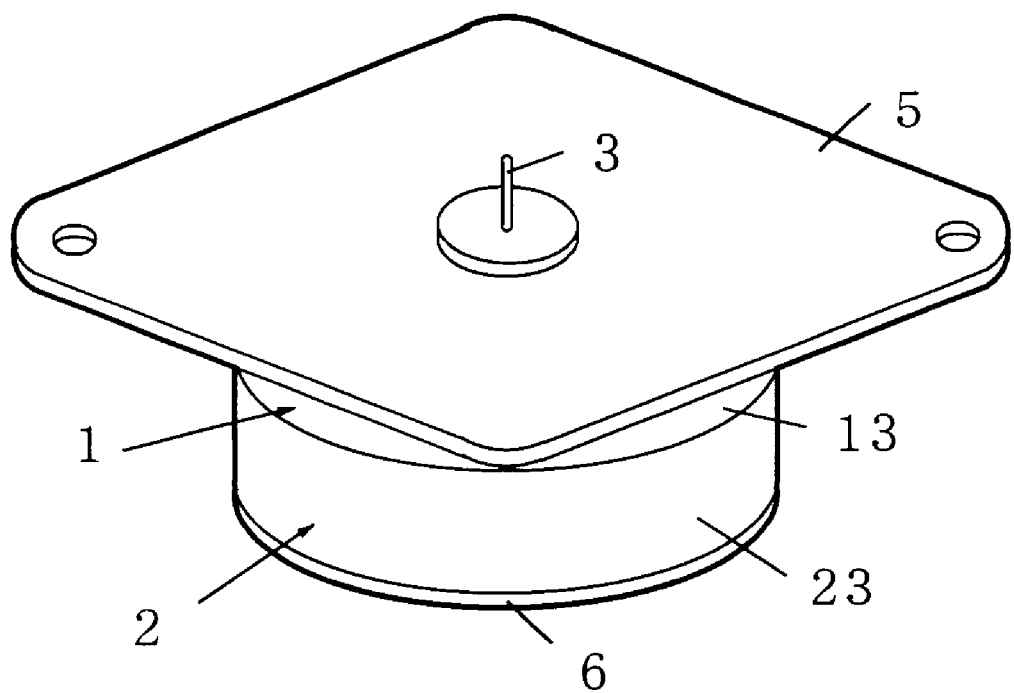
FIG. 1 is a perspective view of the external appearance of a stepping motor according to a first embodiment of the present invention.
Figure 2:
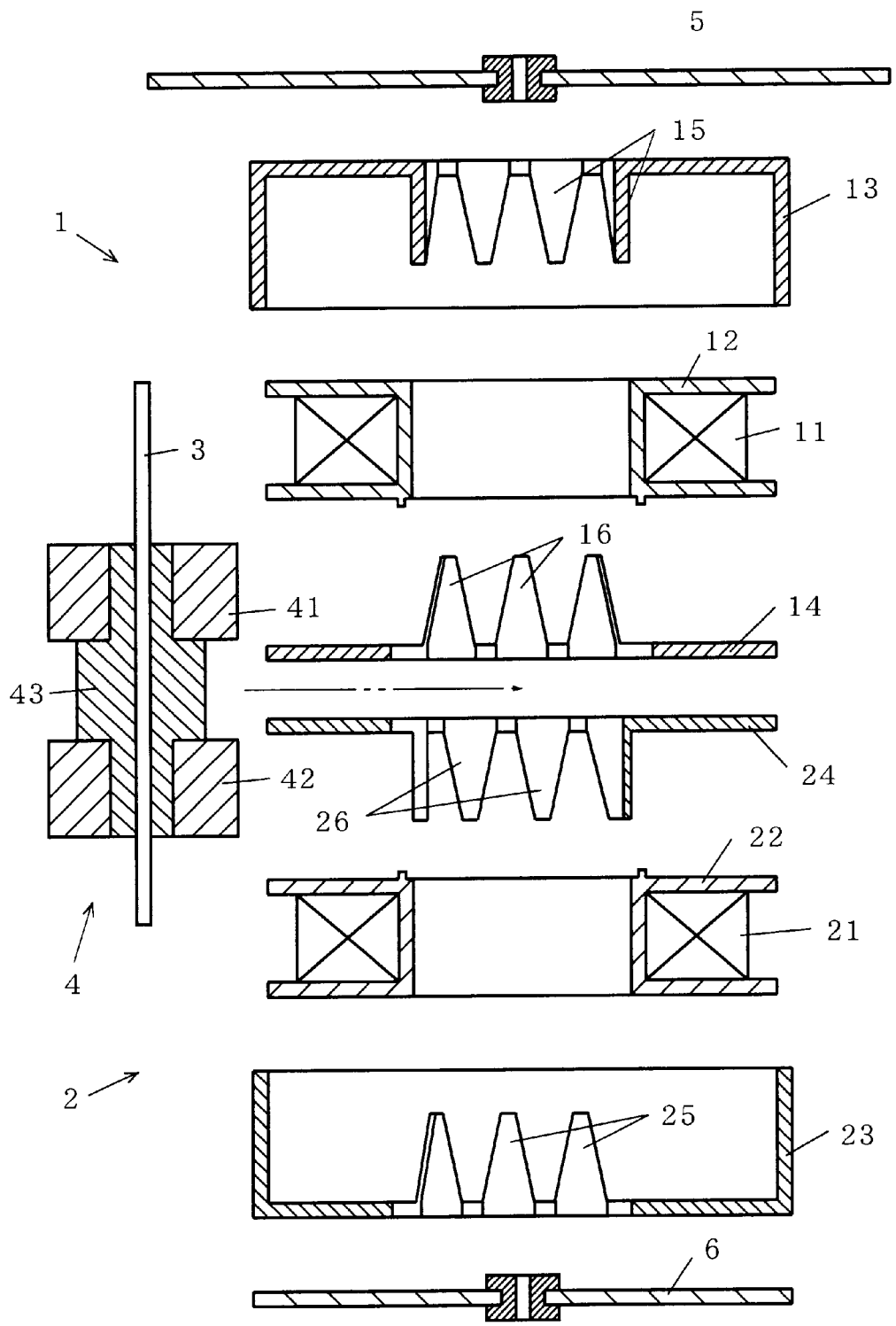
FIG. 2 is an exploded cross sectional view of the stepping motor shown in FIG. 1.
Figure 3:
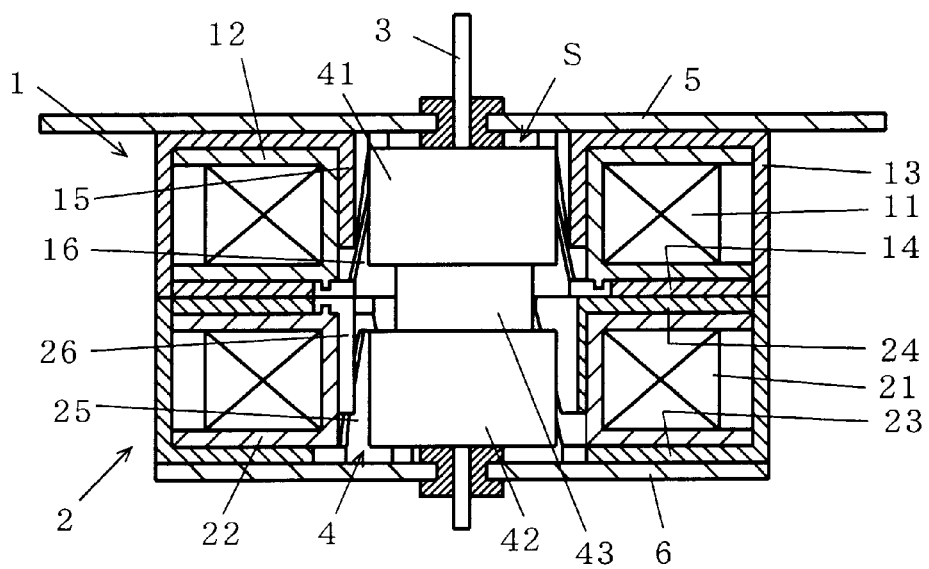
FIG. 3 is a cross sectional view of the stepping motor shown in FIG. 1.

FIG. 1 is a perspective view of the external appearance of a stepping motor according to a first embodiment of the present invention, FIG. 2 is an exploded cross-sectional view of the stepping motor of FIG. 1 with the view illustrating the internal structure of the stepping motor and FIG. 3 is a cross sectional view of the stepping motor of FIG. 1 with the view illustrating how the stepping motor is assembled. Particularly in FIGS. 1 and 2, the stepping motor according to the instant embodiment mainly comprises first and second annular stators 1 and 2, a rotor 4 having a rotary shaft 3 at the center thereof and first and second bearing plates 5 and 6 which axially support the rotor 4 through the rotary shaft 3.

In FIG. 2, the first annular stator 1 comprises a hollow bobbin 12 having a first annularly wound exciting coil 11, a cup-shaped outer yoke 13 in the form of a torus having a central through hole and a planar inner yoke 14 having a central through hole and disposed in the opening of the outer yoke 13 wherein the first annular bobbin 12 is disposed between the outer and inner yoke 13 and 14 in a housed state, a plurality of pole teeth 15 and 16 are formed at the peripheral edges of the through holes of the outer and inner yokes 13 and 14, respectively, along the direction of axis of the rotary shaft 3 of the rotor 4 at a constant pitch and these pole teeth 15 and 16 are alternately combined with each other within the hollow portion of the first annular bobbin 12 so as to face the peripheral surface of the rotor 4 in an annular comb type arrangement.

The second annular stator 2 has also the same structure as the first annular stator 1 and comprises a second hollow annular bobbin 22 having a second annularly wound exciting coil 21, a cup-shaped outer yoke 23 in the form of a torus having a central through hole and a planar inner yoke 24 having a central through hole and disposed in the opening of the outer yoke wherein the second annular bobbin 22 is disposed between the outer and inner yokes 23 and 24 in a housed state, a plurality of pole teeth 25 and 26 are formed at the peripheral edges of the through holes of the outer and inner yokes 23 and 24, respectively, along the direction of axis of the rotary shaft 3 of the rotor 4 at a constant pitch, and these pole teeth 25 and 26 are alternately combined with each other within the hollow portion of the second annular bobbin 22 so as to face the peripheral surface of the rotor 4 in an annular comb type arrangement.

Further, the first and second annular stators 1 and 2 are concentrically laminated to each other along the direction of axis of the rotary shaft 3 of the rotor 4 in such a manner that the yokes 14 and 24 lie adjacent to each other, and as shown in FIG. 3, constitute a laminated body of the annular stators 1 and 2 with a hollow portion S formed at the center thereof.

In the instant embodiment, the rotor 4 comprises first and second cylindrical magnets 41 and 42 made of, for example, ferrite, and fixed to the rotary shaft 3 through a magnet holder in concentric and spaced-apart relationships with each other, and a plurality of magnetic poles N and S extending to the direction of axis of the rotary shaft 3 are alternately magnetized to the peripheral surfaces of the first and second magnets 41 and 42 along the rotational direction at a constant pitch, so that the phases of the magnetic poles of the magnets 41 and 42 are made to coincide with each other.

Then, the rotor 4 is received within the hollow portion S of the laminated body of the annular stators 1 and 2 and rotatably supported by the first and second bearing plates 5 and 6 fixed to the annular stators 1 and 2, respectively, so that the magnetic poles of the magnets 41 and 42 are respectively opposed to the pole teeth 15, 16 and 25, 26 of the inner and outeryokes 14, 13 and 21, 23 at a predetermined interval.(refer to FIG. 3)

Figure 4:
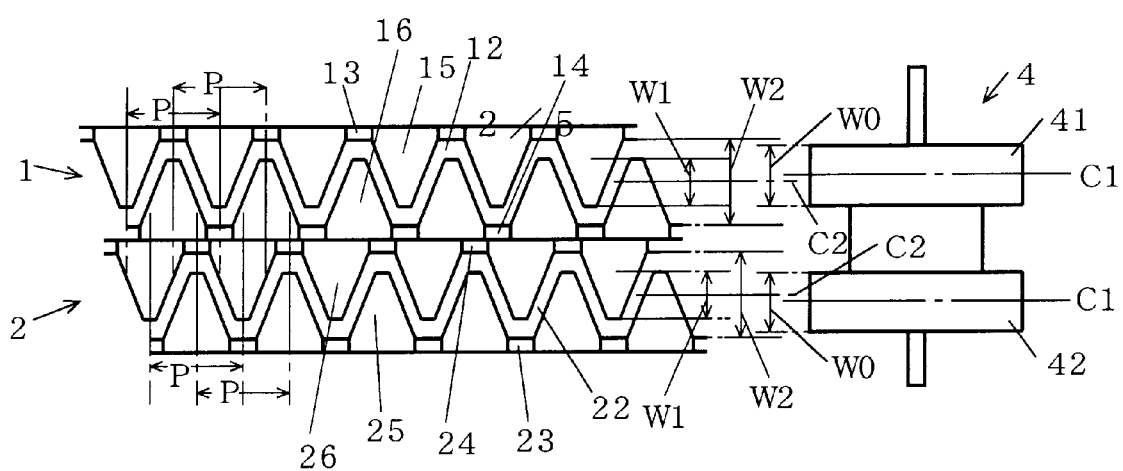
FIG. 4 is an illustrative view showing a developed state of a stator together with a rotor.

FIG. 4 is an illustrative view showing a developed state of the stators 1 and 2 together with the rotor 4 so as to illustrate a detailed positional relationship between each of the annular stators 1 and 2 and the rotor 4 according to the first embodiment wherein the pole teeth 15, 16 and 25, 26 are each formed to have an equal basic pitch P, the phase of the arrangement of the pole teeth 15, 16 making a pair and that of the pole teeth 25, 26 making a pair are shifted from each other by ½ P in the rotational direction of the rotor 4 and accordingly, the pole teeth 15 and the pole teeth 26 which are most separated from earth other are shifted from each other by ¼ P in the rotational direction of the rotor 4.

In this case, the relationship between the stators 1, 2 and the rotor 4 is so established that when the width of each of the magnets 41 and 42 in the rotational direction of the rotary shaft 3 is expressed by W0, the width of overlapping of the pole teeth 15 and 16 and the width of overlapping of the pole teeth 25 and 26 are each expressed by W1 and the space between the internal surfaces of the outer and inner yokes 13 and 14 sandwiching the pair of teeth 15, 16 therebetween and the space between the internal surfaces of the outer and inner yokes 23 and 24 sandwiching the pair of teeth 25, 26 therebetween ( that is, the thickness' of the first and second bobbins in the axial direction) are each expressed by W2, the relationship of W2>W0>W1 is satisfied.

Figure 5:
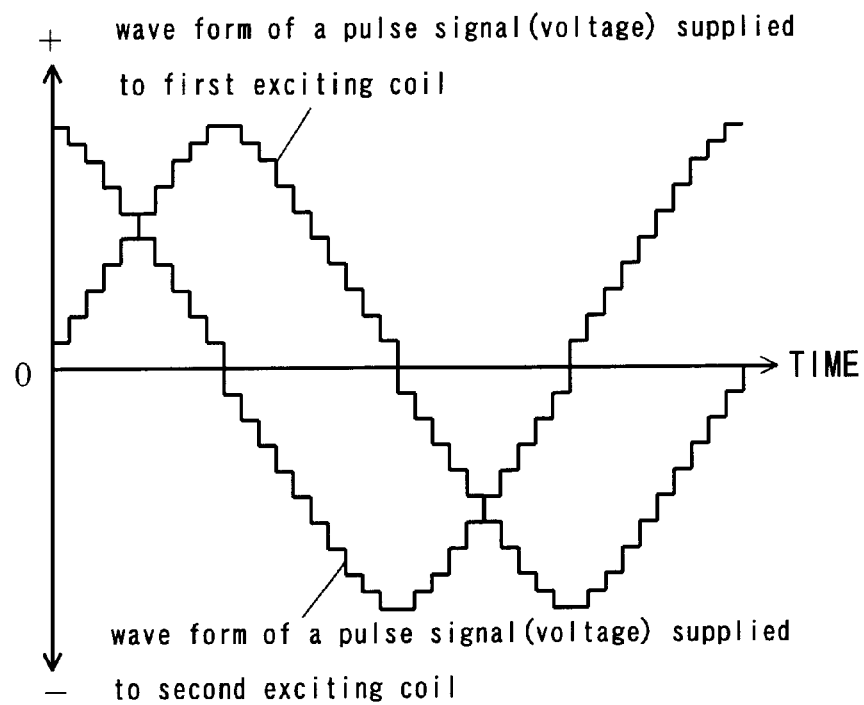
FIG. 5 is a waveform diagram showing the waveform of a pulse signal supplied to an exciting coil.

The stepping motor having the above-described structure according to the instant embodiment is driven in such a manner that a pulsating signal (voltage) having a waveform shown in FIG. 5, for example, is supplied to the first and second exciting coils 11 and 21 from a drive circuit (not shown). This pulsating signal is a signal having a SIN or COS waveform which becomes a typical approximate waveform for effecting a mechanical stepped motion (a mechanical rotational angle) determined by the pitch P of the pole teeth 15, 16 and 25, 26 of the outer and inner yokes 12, 13 and 23, 24 defined by a so called micro step drive (every rotational angle which is obtained by dividing the mechanical rotational angle into a predetermined number of divisions) and by such microstep drive, the rotor 4 can be rotated clockwise and counter-clockwise by every rotational angle in correspondence to the divided number. Thus, when an indicator (not shown) is fixed to the rotary shaft 3 and the drive circuit is caused to perform a microstep drive in correspondence to the measured value of the velocity and the like of a vehicle, the rotor can be used as a movement for an analogue type measuring instrument.

Figure 6:
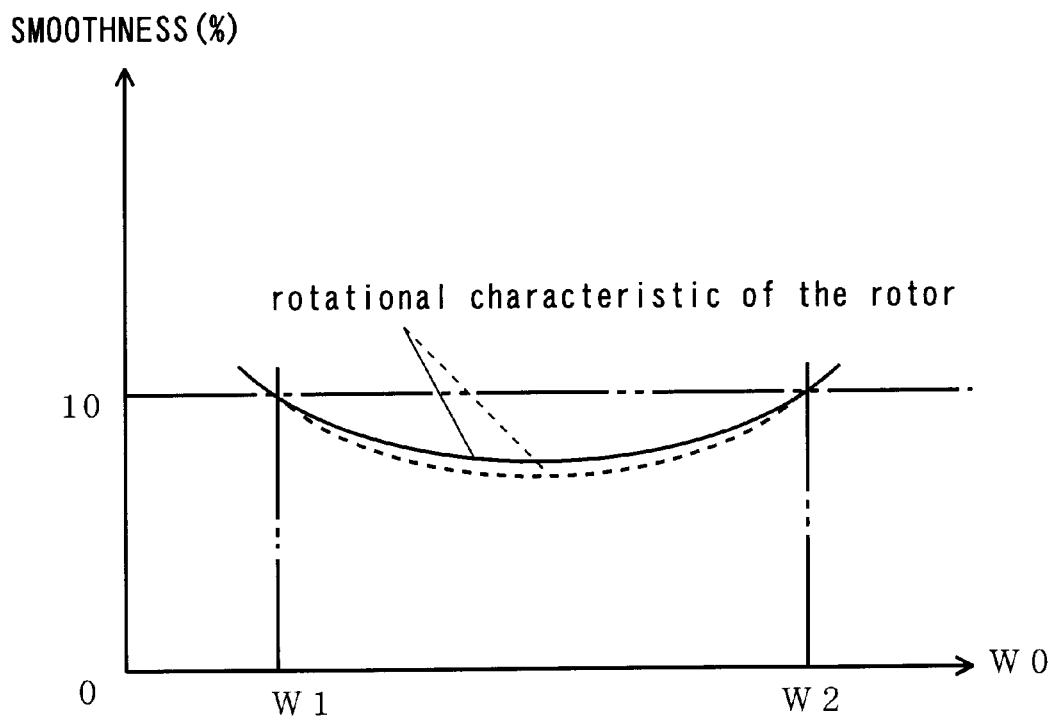
FIG. 6 is a graph showing the rotational characteristic of the rotor according to the first embodiment of the invention.

Now, the reason why the above-mentioned width W0 is so set as to satisfy the relationship of W2>W0>W1 will be explained. This size setting is a result of experiments in which in order to achieve the smoothness of rotation of the rotor 4, a plurality of kinds of rotors having different W0 sizes and a plurality of sets of outer and inner yokes 13, 14 and 23, 24 having different W1 and W2 sizes, respectively, were prepared and combinations of these sets of rotors and yokes were compared with one another. According to these experiments, it has been found that as shown in FIG. 6, the rotational characteristic of the rotor 4 shown by a solid line has a degree of smoothness of not more than 10% when the width W0 is larger than the width W1 and smaller than the width W2. That is, in FIG. 6, the degree of smoothness (%) shown along a vertical axis is a value which was obtained in such a manner that an optical rotary encoder was fixed to the rotary shaft 3 so as to measure the (rotational) angular velocity (deg/sec) of the indicator, an average value A of the angular velocity per rotation of the indicator (the rotor 4) and the distribution (the reference value B of variation) of the angular velocity during one rotation of the indicator were obtained and both of the values were calculated on the basis of a calculation formula of B/A×100. From this value, it will be seen that the smaller the value (%), the greater the degree of smoothness of rotation. Further, the value of the degree of smoothness of not more than 10% is a criterion (the minimum value) at which no physical disorder takes place with respect to the rotation of the indicator when, for example, the indicator is mounted to the rotary shaft 3 and the stepping motor is used as a movement of the analogue type indicating meter.

Further, in the instant embodiment, by shifting the center C1 of the width W0 outwardly of the center C2 of the width W2 (W1) as shown in FIG. 4, a smoother rotational characteristic of the rotor 4 as shown by a dotted line in FIG. 6 was obtained as a result of comparison and verification by experiments of each of the cases where the center C1 is inside the center C2 and the center C1 is outside the center C2 as shown in FIG. 4.

Thus, in the instant embodiment, the first annular stator 1 comprising a set of inner and outer yokes 14 and 13 forming the magnetic path of the first exciting coil 11 and the second annular stator 2 comprising a set of inner and outer yokes 23 and 24 forming the magnetic path of the second exciting coil are concentrically laminated in such a manner that the inner yokes 14 and 24 come to lie adjacent to each other so as to form the laminated body of the stators 1 and 2, the rotor 4 is rotatably supported within the hollow portion S of the laminated body of the stators 1 and 2 through the rotary shaft 3, the rotor 4 is constituted by the first and second magnets 41 and 42 each having a peripheral surface to which a plurality of magnetic poles are alternately and heteropolarly magnetized along the rotational direction of the rotor 4 and concentrically fixed to the rotary shaft 3 and two sets of pole teeth extending into the hollow portion S along the axis of the rotary shaft 3 of the rotor 4 from the inner and outer yokes 14, 24 and 13, 23 and opposing to the first and second magnet 41 and 42 of the rotor 4 in the annular comb type arrangement, and wherein the width W0 of each of the first and second magnets 41 and 42 is set larger than the overlapping width W1 in the axial direction of the rotary shaft 3 of the respective pole teeth forming the respective pair in correspondence to the magnets 41 and 42, and smaller than the width W2 between the inner surfaces of the inner and outer yokes 14, 13 and 24, 23 forming the pair with respect to the respective pair of the pole teeth, so that the smoothness of rotation of the rotor 4 can be improved, and in the case of using it as a movement for an analogue type indicating meter, the rotation of an indicator free of physical disorder can be obtained without the necessity of using a reduction gear mechanism.

Further, when the width W0 is set to lie outside the center of the width W2 between the inner surfaces of the inner and outer yokes 14, 13 and 24, 23, the degree of smoothness of rotation of the rotor can be further improved.

Figure 7:
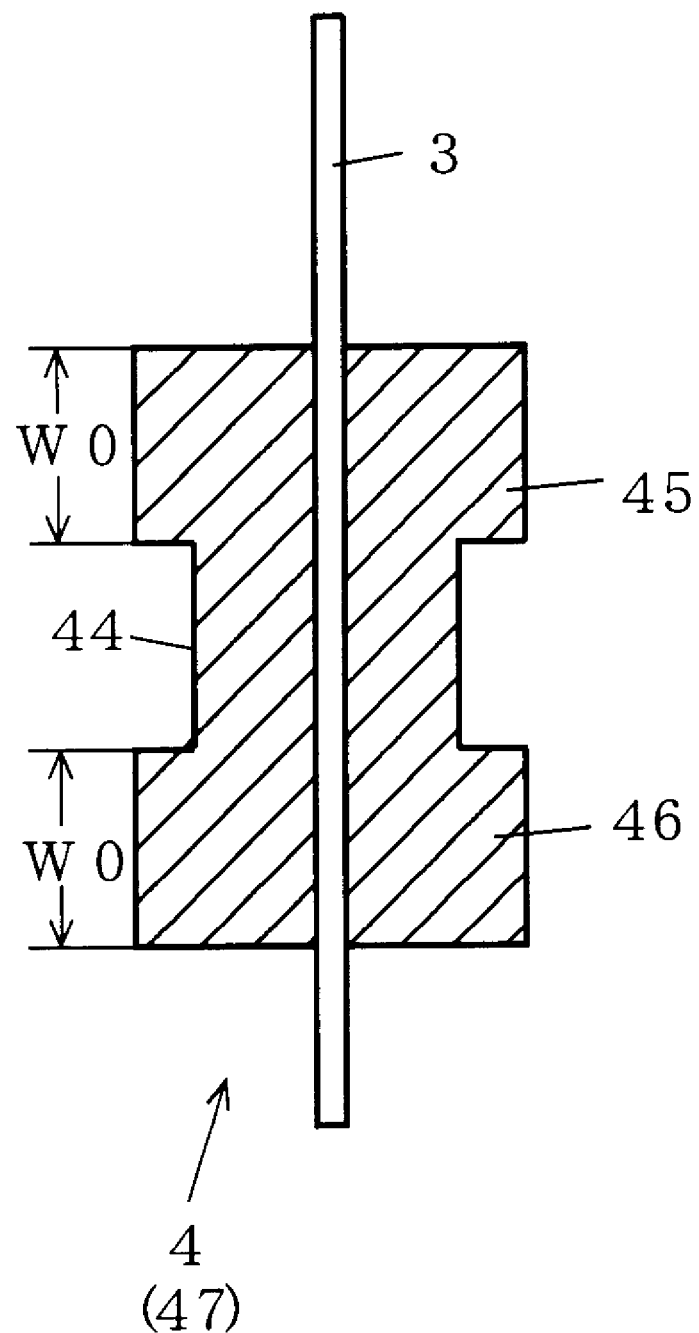
FIG. 7 is a cross sectional view showing a rotor according to a second embodiment of the present invention.

FIG. 7 is a cross sectional view of the rotor according to a second embodiment of the present invention wherein the rotor 4 is constructed by a plastic magnet 47 whose outer peripheral surface is alternately and heteropolarly magnetized with a plurality of magnetic poles along the rotational direction thereof and which has a small-diameter portion 44 at the center and first and second large-diameter portions 45 and 46 at both ends thereof, respectively, so as to correspond to the annular stators 1 and 2. In this case, the dimensional relationship of W2>W0>W1 with respect to the width W0 of the rotor is established and it is possible with such rotor structure to obtain the same effect as in the case of the above-described first embodiment.

Industrial Availability

As described above, the present invention has been explained with reference to a two-phase or four-phase permanent magnet type stepping motor but the invention is not always limited thereto and can also be applied to a single- or multi-face (more than four-phase) permanent magnet type stepping motor structure.

What is claimed is:

1. A stepping motor comprising:

a first annular stator comprising an inner yoke and an outer yoke for forming a magnetic path for a first annularly wound exciting coil, a second annular stator comprising an inner yoke and an outer yoke for forming a magnetic path for a second annularly wound exciting coil and laminated concentrically with the first annular stator, and a rotor rotatably supported by a rotary shaft within a hollow portion of a stator-laminated body formed by concentrically and vertically laminating the first and second annular stators with the inner yokes thereof lying adjacent to each other, wherein said rotor comprises a first and a second magnet each having a plurality of magnetic poles heteropolarly magnetized to the outer peripheral surface thereof in an alternative fashion along the rotational direction thereof and concentrically fixed to said rotary shaft, wherein two sets of pole teeth are disposed on said first and second annular stators, respectively, in an annular comb-teeth arrangement such that they extend into the hollow portion of said stator-laminated body from said inner and outer yokes along the axis of said rotor, wherein when the axial width of each of the first and second magnets is expressed by W0, the axial width of overlapping of each of the two sets of pole teeth corresponding to said first and second magnets is expressed by W1 and the width of a space between the inner surfaces of each of said inner and outer yokes making a pair sandwiching each of said sets of pole teeth therebetween is expressed by W2, W2>W0>W1; and wherein the center of said width W0 is offset towards said outer yokes with respect to the center of said width W2.

2. A stepping motor comprising:

a first annular stator comprising an inner yoke and an outer yoke for forming a magnetic path for a first annularly wound exciting coil, a second annular stator comprising an inner yoke and an outer yoke for forming a magnetic path for a second annularly wound exciting coil and laminated concentrically with the first annular stator, and a rotor rotatably supported by a rotary shaft within a hollow portion of a stator-laminated body formed by concentrically laminating the first and second annular stators with the inner yokes thereof lying adjacent to each other through the rotary shaft, wherein said rotor comprises a magnet whose peripheral surface is heteropolarly magnetized with a plurality of magnetic poles in an alternative fashion along the rotational direction thereof and which has first and second large-diameter sections at both ends thereof so as to correspond to said first and second annular stators, respectively, wherein two sets of pole teeth are disposed on said first and second annular stators, respectively, in a comb teeth arrangement so as to face said first and second large-diameter portions such that they extend into the hollow portion of said stator laminated body from said inner and outer yokes along the axis of said rotor, wherein when the axial width of each of said first and said second large-diameter section is expressed by $W0$, the axial width of overlapping of each of said two sets of pole teeth corresponding to said large-diameter sections is expressed by $W1$ and the width of a space between the inner surfaces of each of said inner yokes and each of said outer yokes is expressed by $W2$, $W2>W0>W1$; and wherein the center of said width $W0$ is offset towards said outer yokes with respect to the center of said width $W2$.

* * * * *